United States Patent [19]

West

[11] 4,200,990
[45] May 6, 1980

[54] METRIC RAFTER SQUARE AND METHOD OF USING SAME

[75] Inventor: Robert F. West, West Simsbury, Conn.

[73] Assignee: The Stanley Works, New Britain, Conn.

[21] Appl. No.: 952,691

[22] Filed: Oct. 19, 1978

[51] Int. Cl.² .............................................. B43L 7/00
[52] U.S. Cl. ...................................................... 33/476
[58] Field of Search ................ 33/112, 113, 474, 476, 33/479, 480

[56] References Cited

U.S. PATENT DOCUMENTS

| | | | |
|---|---|---|---|
| 247,353 | 9/1981 | Howard | 33/113 |
| 651,057 | 6/1900 | Roberts | 33/113 |
| 672,455 | 4/1901 | Nicholls | 33/113 |
| 691,192 | 1/1902 | Smith et al. | 33/113 |
| 937,202 | 10/1909 | Bailey | 33/113 |
| 1,102,689 | 7/1914 | Sargent | 33/113 |
| 1,196,519 | 8/1916 | Caylor | 33/113 |
| 1,236,817 | 8/1917 | Bick | 33/113 |
| 1,241,976 | 10/1917 | Hill | 33/113 |
| 1,463,605 | 7/1923 | Walters | 33/113 |
| 1,704,462 | 3/1929 | Crandlemere | 33/113 |

FOREIGN PATENT DOCUMENTS

| | | | |
|---|---|---|---|
| 820790 | 8/1937 | France | 33/113 |
| 299404 | 6/1954 | Switzerland | 33/113 |
| 11060 | of 1906 | United Kingdom | 33/113 |

*Primary Examiner*—Harry N. Haroian

[57] ABSTRACT

A metric rafter square has a body and tongue with lengths of at least 300 mm and 400 mm respectively and scales along their outer edges in millimeters. A rise per meter table on the body includes a series of entries which cooperates with a rise per meter scale disposed along the tongue and pivot points disposed along the body. The rise per meter scale on the tongue is cooperatively compressed and has graduations and a series of numerical values along its length for the graduations which are greater than the actual values represented by the unit length of the scale designated thereby. These values on the scale cooperate with the values set forth in the rise per meter table to establish the required angle between the preselected pivot points on the body and cooperative points on the rise per meter scale determined from the rise per meter table.

Methods are disclosed for the use of the metric square in the scribing of framing members with the appropriate lines to establish lengths and desired angles for end and side cuts.

15 Claims, 5 Drawing Figures

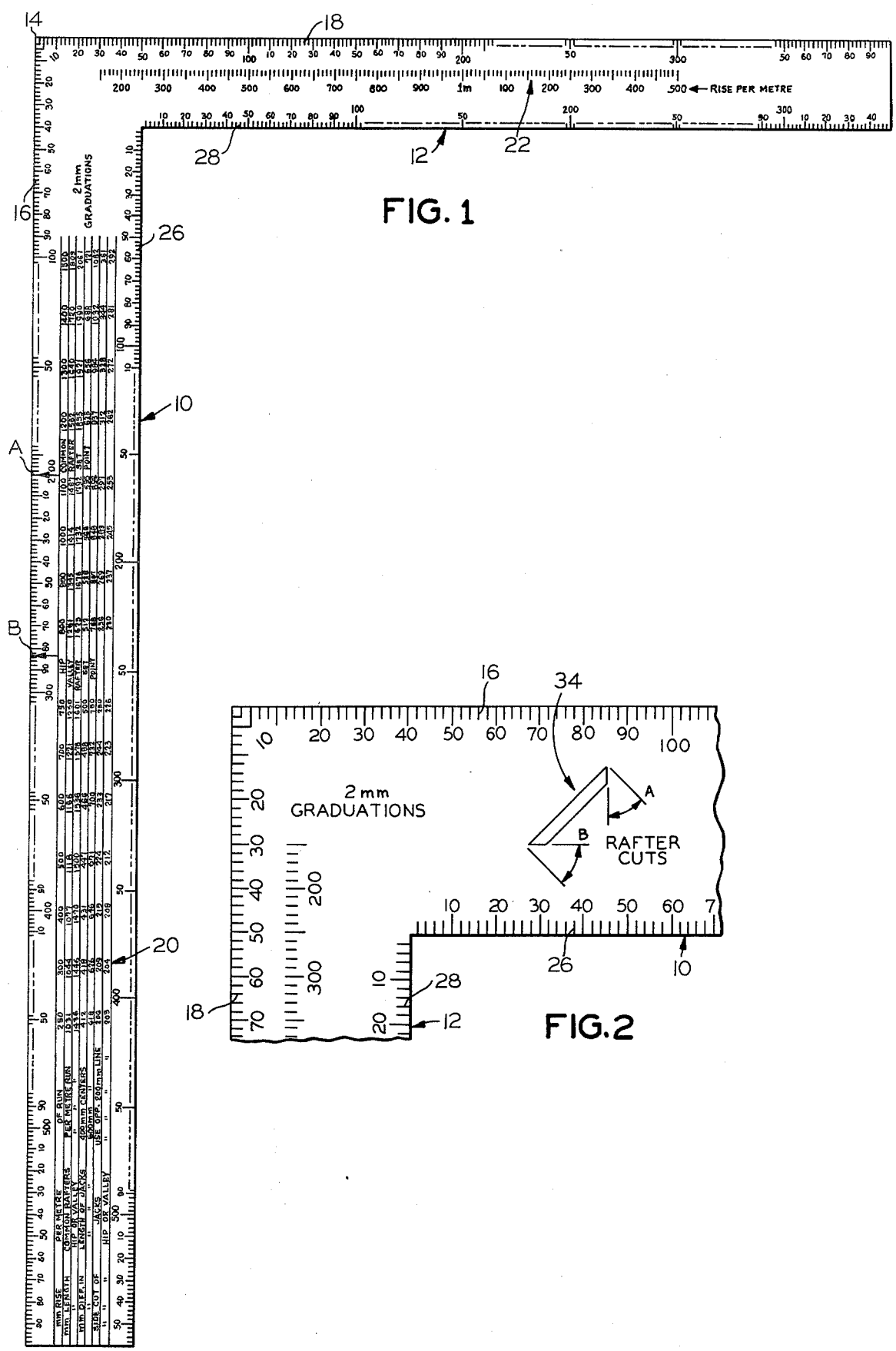

METRIC RAFTER SQUARE AND METHOD OF USING SAME

BACKGROUND OF THE INVENTION

For many years, rafter squares have been used in establishing the angular relationships of the cuts for the ends of members used for framing roofs. Such squares as used in the United States, Canada and England have used graduations in feet and inches and have often included tables which would permit determination of various angular relationships and lengths based upon a primary entry of length of rafters per foot of run. Frequently, these tables will have entries aligned with a foot and inch scale on the tongue or body which serves as the factor for introducing the value of rise into the equation. Such squares have proven extremely useful in framing roofs since the relationship between inches and feet is simple to establish.

Illustrative of squares of this type are those shown in the following U.S. Pat. Nos.: Howard 247,353 granted Sept. 20, 1881; Roberts 651,057 granted June 5, 1900; Nicholls 672,455 granted Apr. 23, 1901; Smith et al 691,192 granted Jan. 14, 1902; Caylor 1,196,519 granted Aug. 29, 1916; Bick 1,236,817 granted Aug. 14, 1917; Hill 1,241,976 granted Aug. 2, 1917; Walters 1,463,605 granted July 31, 1923; and Crandlemere 1,704,462 granted Mar. 5, 1929.

Although various metric value squares have been proposed and utilized, none have offered the flexibility and the ease of the angular determinations provided by some of the above-mentioned U.S. patents. Illustrative of metric squares are those shown in Swiss Pat. No. 299,404; British Pat. No. 1,253,680; and French Pat. No. 820,790.

As will be readily appreciated, the metre is a considerably larger unit of measure than the foot. As a result, attempting to utilize millimetres and full metres as the means for determining angular relationships presents a substantial problem from the standpoint of size. Abbreviating the length of the scale employed to less than a metre presents a problem from the standpoint of attempting to orient position determining points on the tongue and blade.

It is an object of the present invention to provide a novel rafter square utilizing metric scales and metric relationships to permit determination of various angular relationships and lengths of framing members and their cuts.

It is also an object to provide such a rafter square which is relatively compact and yet permits highly accurate establishment of such cuts, dimensions and angular relationships.

Another object is to provide such a rafter square including tables for conveniently determining lengths of the roof framing members for various values of rise per metre of run and for determining the included angles for side cuts.

SUMMARY OF THE INVENTION

It has now been found that the foregoing and related objects and advantages may be readily attained in a metric rafter square which has body and tongue elements intersecting at a right angle at one end thereof. The body and tongue have lengths of at least 400 and 300 millimetres respectively and have scales graduated in millimetres along the outer edges thereof which commence at the intersection of their outer edges. Between the longitudinal edges of the body is a rectilinearly extending rise per metre table, and the tongue is provided with a rise per metre scale thereon with graduations and with numerical values increasing from the intersection towards the opposite or free end thereof. The rise per metre table is based upon a preselected pivot point along the body scale which is within the range of 175-225 millimetres, and the rise per metre scale on the tongue is cooperatively compressed and has numerical values along the length thereof which are greater than the actual values for the unit length of the scale designated thereby and cooperate with the values set forth in the rise per metre table to establish the required angles between the preselected pivot point on the body scale and a cooperating point on the tongue scale aligned with the graduation on the rise per metre scale specified in the rise per metre table.

In the preferred embodiment, the rise per metre scale is disposed intermediate the longitudinal edges of the tongue, and the pivot point on the body scale is at 200 millimetres. The rise per metre table includes as the primary entry a series of numerical values of millimetres rise per meter of length of run of rafters, and it includes as a second entry a parallel series of numerical values of millimetres length for common rafters per metre of length of run.

The rise per metre table desirably includes a series of numerical values for millimetres of length for hip or valley rafters per metre of run, and these values are selected to cooperate with a second preselected pivot point on the body scale which is within the range of 250-310 millimetres. Most desirably, the rise per metre table additionally includes at least one series of numerical values of millimetres for difference in length of jack rafters at specified center-to-center spacing along the length of the hip or valley per metre of run of the rafter.

In the optimum embodiment, the rise per metre table also includes a parallel series of numerical values for determining the orientation of the side cut of the jack rafter. It also includes a parallel series of numerical values for determining the orientation of the side cut for a hip or valley rafter.

The preferred metric rafter squares also include a second table defining the angles for the cuts for the several roof members in which the primary entry is a series of numerical values for millimetres of rise per metre of run and parallel series of entries are provided defining the angles of the plumb and bottom cuts for the common rafters and defining the angles of the side cuts for the jacks and for the hip and valley rafters.

In the method of framing a roof in accordance with the present invention, a rafter square is formed with a body and tongue intersecting at a right angle at one end thereof, and the body and tongue have lengths of at least 400 and 300 millimetres respectively. Scales are formed along the outer edges of the body and tongue and are graduated in millimetres commencing at the intersection of the outer edges. A rise per metre table is formed in the body between its edges and a rise per metre scale is formed in the tongue, all as hereinbefore indicated. The rise per metre table is consulted to derive therefrom the numerical value for the length of the framing member for the desired length of run for the rafter. The rafter scale is then oriented upon an elongated framing member with the pivot point disposed along one longitudinal edge of the framing member and with the point on the outer edge scale of the tongue aligned with the graduation on the rise per metre scale determined from the rise per metre table being disposed along the same edge of the framing member. With the rafter scale so aligned, the outer edge of at least one of the tongue and body is used to scribe the desired angular orientation of the cut relative to the longitudinal edges of the framing member.

In using the rise per metre scale, the length of the framing member derived with respect to millimetres length of common rafters per metre of length of run is multiplied by the length of the run, and one-half the thickness of the ridge member is deducted from the product. In using the rise per metre table for determination of the length of hip or valley rafters, the value found in the scale is simply multiplied by the length of run.

BRIEF DESCRIPTION OF THE DRAWINGS

FIG. 1 is a plan view of metric rafter square embodying the present invention;

FIG. 2 is a greatly enlarged fragmentary plan view of the heel portion of the opposite face thereof;

DETAILED DESCRIPTION OF ILLUSTRATED EMBODIMENT

Figure 3:
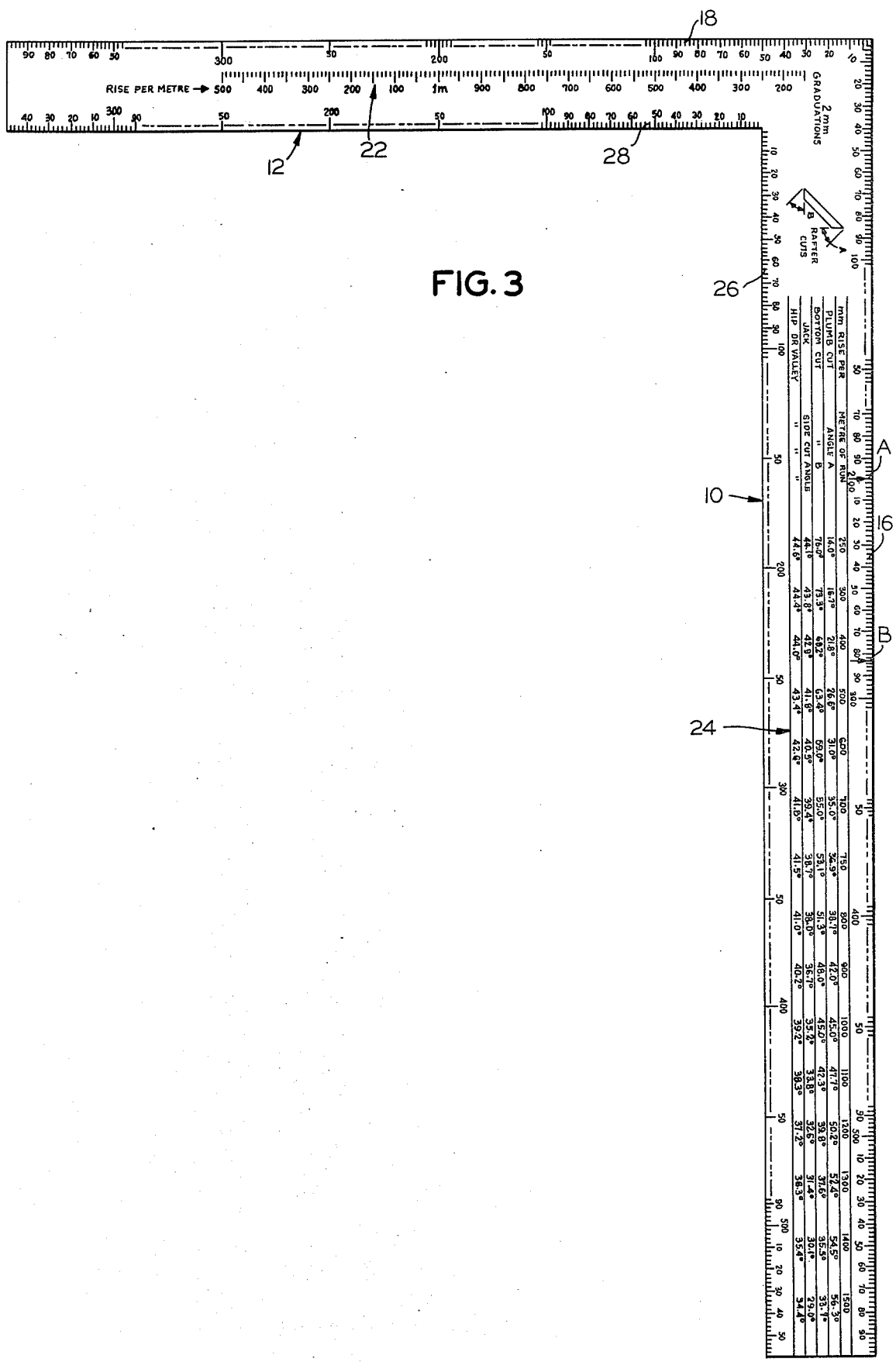
FIG. 3 is a plan view of the opposite face of the metric rafter square, drawn to the same scale as FIG. 1.

Turning first to FIGS. 1-3 of the attached drawings, therein illustrated is a metric rafter square embodying the present invention and comprised of a body generally designated by the numeral 10 and a tongue generally designated by the numeral 12 which intersect at one end thereof at a right angle. The intersection of the outer edges of the body 10 and tongue 12 comprise the heel 14, and a metric scale 16 is provided along the outer edge of the body 10 on both faces and increases in numerical value with distance from the heel 14. Similarly, a metric scale 18 is provided along the outer edge of both faces of the tongue 12 and increases in value from the heel 14.

On one face of the body 10 is a rise per metre table generally designated by the numeral 20 and which has as the primary entry the text "mm RISE PER METRE OF RUN" of rafter and a series of numerical values for each of the columns ranging from 250-1500 mm. The next line entry in the table is comprised of the text "mm LENGTH [of] COMMON RAFTERS PER METRE RUN" and a series of numerical values determined for the corresponding "RISE" value in the column heading. The third line comprises the text "[mm LENGTH of] HIP OR VALLEY [RAFTERS] [PER METRE RUN]" and a series of numerical values determined for the corresponding "RISE" value in the column heading. With these several entries, it is possible to quickly determine the length of the framing members for either common rafters or hip and valley rafters.

As will be appreciated, hip and valley roofs use jacks along the length and the next two line entries permit determination of the difference in length of these members based upon 400 and 600 mm center-to-center spacings. As seen, this line has text reading "mm DIFF. IN LENGTH OF JACKS [on] 400 [or 600] mm CENTERS" and a series of numerical values determined for the corresponding "RISE" value in the column heading. Following these two entries is an entry for determining the side cut of a jack rafter when it frames to the hip or valley rafter including the text "SIDE CUT OF JACKS", followed by the instructional text "USE OPP. 200 mm LINE" and a series of numerical values determined for the corresponding "RISE" value in the column heading. The last line entry in the table is to determine the side cut of hip or valley rafter and includes the text by ditto marks in part "[SIDE CUT OF] HIP OR VALLEY [RAFTERS]" and the instruction by ditto marks "USE OPP. 200 mm LINE" and a series of values determined for the corresponding "RISE" value in the column heading.

On the reverse face of the body 10 is a rafter cut angle table generally designated by the numeral 24 and similar to the table 20. However, it permits determination of included angles for plumb, bottom and side cuts to be used with power tools and the like which permit angular adjustment of their cutting action. This table is used in conjunction with the angle diagram shown to the left of the table as seen in FIG. 3.

As in the case of the table 20, the primary entry is "mm RISE PER METRE OF RUN" of the roof and a series of corresponding numerical values. The second line entry is comprised of the text "PLUMB CUT ANGLE A" and a series of angle values determined for the corresponding "RISE" value. The third line entry is comprised of the text "BOTTOM CUT ANGLE B" and a similarly determined series of angle values. The fourth and fifth lines are comprised of the text "JACK SIDE CUT ANGLE" and "HIP OR VALLEY SIDE CUT ANGLE" and correspondingly determined series of angular values.

To permit use of the metric scale with the numeral values determined from the table 20, both faces of the tongue 12 are provided with a rectilinearly extending rise per metre scale 22 disposed intermediate the longitudinal edges thereof with graduations and with numerical values increasing from the heel 14. This scale is compressed i.e., the numerical values set forth along the length of the scale for the graduations thereof are greater than the actual values represented by the unit length of the scale designated thereby and cooperate with the values set forth in the rise per metre table to define angular relationships between a numerical value therealong and the pivot points A or B along the scale 16 along the body 10. As seen, both faces of the body 10 have the metric scale 16 and arrow marks at the 200 mm and 283 mm points to provide the pivot points A and B respectively. Moreover, the faces of the body 10 bear the legends "COMMON RAFTER SET POINT" and "HIP VALLEY RAFTER SET POINT" adjacent the indicia for the points A and B respectively.

Both the body 10 and tongue 12 have metric scales along their inner edges on each face thereof designated by the numerals 26 and 28 respectively and these scales commence at the intersection of the inner edges and increase in value therefrom. Conveniently, the scales 16, 18, 26, and 28 all use graduations at 2 mm intervals.

To use the square, the run and the rise for the roof are noted. As is conventional, the rise is the distance from the top surface of the plate or sidewall to the center of the ridge board, and the run is one-half the span or the distance between the outer sides of the plates of the two walls. By dividing the rise by the length of the run, the rise per meter of run is determined, which provides the primary entry to either of the tables 20 and 24. The numerical values for "RISE PER METRE RUN" heading each column are in 50 mm increments which will cover the most frequently encountered conditions, and interpolation may be used for other values.

In determining the necessary length for the framing member to provide a common rafter, the second line entry is determined in the appropriate column, and the value is multiplied by the number of metres of the run to obtain the total length from plate to ridge. Since it is customary to employ a ridge board, one-half its thickness must be deducted, and the length of any overhang or eave must be added to obtain the overall length of the rafter before cutting. Moreover, the measuring line is along the longitudinal center line of the rafter.

Figure 4:
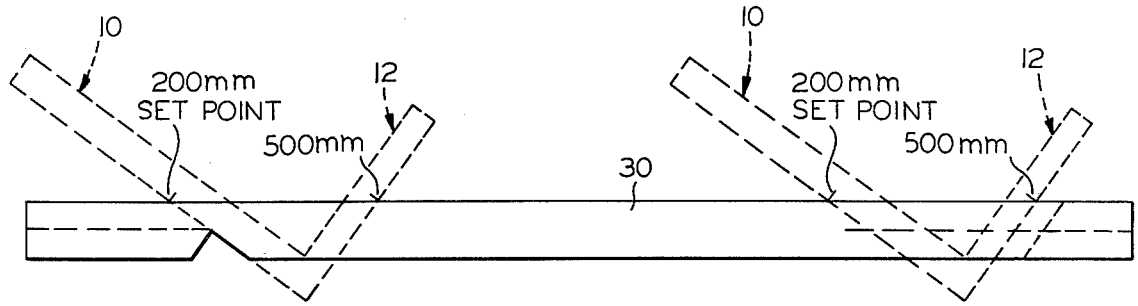
FIG. 4 is a diagrammatical illustration showing the metric rafter square of FIG. 1 used for orienting cuts on a common rafter.

Having determined the actual length, the ends of the framing member 32 are marked by use of the square as seen in FIG. 4. As previously indicated the measuring line is along the longitudinal center line. To make the bottom cut, the pivot point A on the body 10 is disposed along the edge of the framing member 30 and the point on the outer scale 18 of the tongue 12 aligned with the indicium on the rise per metre scale 22 determined from the table 20 is also placed upon the outer edge and the scale moved along the framing member until the outer edge of the body member intersects the "measuring line" at the determined length. As seen at the left hand side of FIG. 4, this then establishes the bottom cut as shown to seat the rafter upon the plate.

The plumb or upper cut is established as shown at the right hand side of FIG. 4 with the pivot point A disposed along the same edge and towards the bottom cut and the point on the tongue scale 18 aligned with the appropriate indicium on the rise per metre scale 22 intersects the "measuring line" at the determined length. As shown, the square is set to cut with an allowance for the ridge thickness. The dotted line to the right indicates the plumb cut if no ridge board were to be employed.

Figure 5:
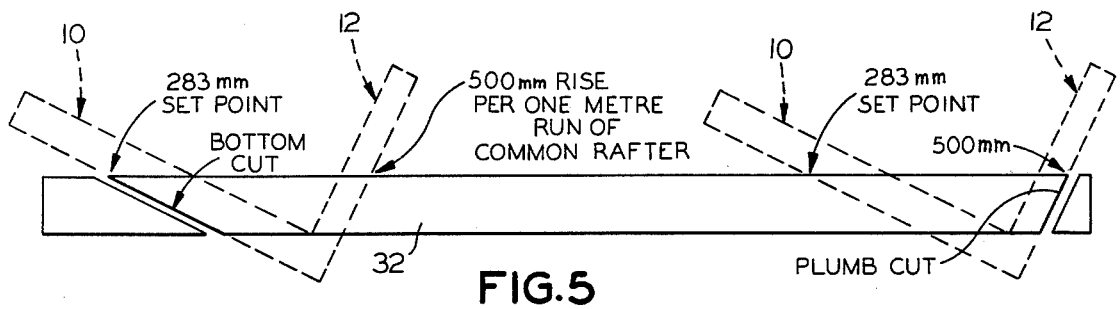
FIG. 5 is a similar view showing the metric rafter square as used for orienting bottom and plumb cuts on a hip rafter.

In FIG. 5, there is illustrated the use of the square to make the bottom and plumb cuts for a hip or valley rafters. In measuring these rafters, the measuring line is the outer edge rather than the center line as in the case of the common rafters. The table is entered in the first line by the rise per metre run value for the roof and the length determined from the third line is multiplied by the run for the common rafter to obtain the overall length. The square is oriented with the pivot point B, and the point on the tongue scale 18 aligned with the determined indicium as found on the rise per metre scale 22 is also oriented with the edge. The pivot point B is located on the determined length mark on the edge of the framing member 32 and the outer edge of the body 10 determines the bottom cut. With the square in the same orientation, the tongue 12 is located on the other length mark and this determines the plumb cut.

To scribe the side cuts, the value from the appropriate line of the table 20 is determined. Here the square is placed on the edge of the rafter and the pivot point A and the indicium on the tongue scale 18 determined from the table are placed on the same side of the edge of the framing member 32 to establish the angle of the side cut. Obviously, a point on the tongue 12 spaced outwardly from the determined indicium is aligned with the intersection of the opposite side of the edge and the end cut previously made.

The values determined from table 24 may be used to make the angled side cuts simultaneously with the end cuts if appropriate power tools are available.

Most desirably, the square is fabricated from a rugged metal alloy of sufficient thickness to minimize warping and bending during normal usage. The scales and tables are desirably engraved to remain distinct over long periods of use.

Although it is possible to orient the rise per metre scale along the edge of the tongue 12, preferably it is disposed inwardly so as to permit use of a standard metric scale along that edge for other uses of the square.

Thus, it can be seen that the metre square of the present invention is relatively compact and convenient to use since the cooperation of the compressed rise per metre scale on the tongue and the pivot points and rise per metre table on the body readily permits determination of angular relationships. The square employs precise factors and enables relatively precise determination of angles and cuts.

Having thus described the invention, I claim:

1. A metric rafter square comprising a body and a tongue intersecting at a right angle at one end thereof, said body and tongue having respective lengths of at least 400 and 300 millimeters and scales graduated in millimetres along the outer edges thereof commencing at said intersection of the outer edges of said tongue and body, said body having between the edges thereof a rise per metre table and said tongue having a rectilinearly extending rise per metre scale thereon with graduations and with numerical values increasing from said intersection towards the opposite end thereof, said rise per metre table being based upon a preselected pivot point along said body scale within the range of 175–225 millimetres, the numerical values of said rise per metre scale of said tongue being cooperatively compressed along the length thereof and being greater than the actual values for the unit length designated thereby and cooperating with the values set forth in said rise per metre table to establish the required angles between said preselected pivot point on said body scale and a cooperating point on the tongue scale aligned with the graduation on said rise per metre scale determined from said table.

2. The metric rafter square of claim 1 wherein said rise per meter scale is disposed intermediate the longitudinal edges of said tongue.

3. The metric rafter square of claim 1 wherein said riser per meter table includes as the primary entry a series of numerical values of millimeters rise per metre of length of run of rafters and as a second entry a parallel series of numerical values of millimetres length for common rafters per metre of length of run.

4. The metric rafter square of claim 3 wherein said rise per meter table also includes a series of numerical values for millimeters of length for hip or valley rafters per metre of run, said values being selected to cooperate with a second preselected pivot point on said body scale within the range of 250–310 millimetres.

5. The metric rafter square of claim 2 wherein said rise per metre table additionally includes at least one series of numerical values of millimetres for difference in length of jack rafters at specified center-to-center spacing along the length of the hip or valley per metre of run of the rafter.

6. The metric rafter square of claim 5 wherein said rise per metre table includes a parallel series of numerical values for determining the orientation of the side cut of jack rafters.

7. The metric rafter square of claim 4 wherein said rise per metre table includes a series of numerical values for determining the orientation of the side cut for a hip or valley rafter.

8. The metric rafter square of claim 1 wherein said square includes a second table defining the angles of cuts for the several roof members and wherein the primary entry thereof is a series of numerical values for millimetres of rise per metre of run and there is provided a multiplicity of parallel series of entries defining the angles of the plumb and bottom cuts for common rafters, and of the side cuts of jacks and for hip and valley rafters.

9. The metric rafter square of claim 1 wherein said first mentioned pivot point on said body scale is at 200 millimetres.

10. The metric rafter square of claim 4 wherein said first mentioned pivot point on said body scale is at 200 millimetres and wherein said second pivot point on said body scale is at 283 millimetres, and wherein the lengths of said body and tongue are 500 millimetres and 400 millimetres respectively.

11. In the method of framing a roof, the steps comprising:
 a. forming a rafter square having a body and tongue intersecting at a right angle at one end thereof and lengths of at least 400 and 300 millimetres respectively with scales graduated in millimetres along the outer edges thereof commencing at the intersection of said outer edges;
 b. providing on said body between the edges thereof a rise per metre table and on said tongue a rectilinearly extending rise per metre scale with graduations and with numerical values increasing from said intersection towards the opposite end thereof, said rise per metre table being based upon a preselected pivot point along said body scale within the range of 175–310 millimetres, the numerical values of said rise per metre scale of said tongue being cooperatively compressed along the length thereof and being greater than the actual values for the unit length designated thereby and cooperating with the values set forth in said rise per metre table to establish the required angles between said preselected pivot point on said body scale and a point on said tongue scale established by the cooperating graduation on said rise per metre scale determined from said table;
 c. deriving from said rise per metre table the numerical value of the length of the framing member for the desired length of run for the rafter;
 d. orienting said rafter square upon a elongated framing member with said pivot point disposed along one longitudinal edge of said framing member and with the point on said outer edge scale of said tongue aligned with the graduation on said rise per metre scale thereof determined from said table being disposed along the same edge of said framing member; and
 e. using the outer edge of at least one of said tongue and body to scribe the desired angular orientation of the cut relative to the longitudinal edges of said framing member.

12. The method of claim 11 wherein said pivot point is in the range of 175–310 millimetres, wherein said rise per metre scale is provided with a primary entry comprising a series of numerical values of millimetres rise per length of run of rafters and a second entry comprising a parallel series of numerical values of millimetres length for common rafters per metre of length of run; and wherein the length of said framing member is derived from said second entry by multiplying the numerical value determined from the table by the length of run and deducting therefrom one-half the thickness of the ridge member.

13. The method of claim 11 wherein said rise per metre table is provided with another entry comprising a parallel series of numerical values of millimetres of length of hip or valley rafters per metre of run; wherein said body scale point is in the range of 250–310 millimetres and wherein said above-mentioned parallel series of values is selected to cooperate with said second preselected pivot point; and wherein said numerical value for the length of said framing member is derived from said another entry by multiplying the numerical value determined in the table by the length of run.

14. The method of claim 11 wherein said rise per metre table include a series of numerical values for determining the location and orientation of the side cut for a hip or valley rafter at the point where it is to abut the ridge.

15. The method of claim 11 wherein said scale is also provided with a second table defining the angles of cuts for the several roof members and wherein the primary entry thereof is a series of numerical values for millimetres of rise per metre of run and a multiplicity of parallel series of entries are provided defining the angles of the plumb and bottom cuts for the common rafters, and of the side cuts for the jacks and for the hip and valley rafters.

* * * * *

UNITED STATES PATENT AND TRADEMARK OFFICE
CERTIFICATE OF CORRECTION

PATENT NO. : 4,200,990
DATED : May 6, 1980
INVENTOR(S) : Robert F. West

It is certified that error appears in the above—identified patent and that said Letters Patent are hereby corrected as shown below:

```
Column 6, lines 26, 35 (two occurrences), 52, 59, 62;
Column 7, lines 11, 18, 21, 22, 23, 24, 29, 30, 40;
Column 8, lines 19, 21, 30, 33, 48; in each instance,
"millemetres" should be -- millemeters --;

Column 6, lines 29, 30, 33, 35, 40, 43, 50, 53, 57, 61,
          64, 67;
Column 7, lines 4, 11, 34, 35, 38, 41, 45, 49
Column 8, lines 1, 9, 18, 22, 29, 31, 40, 48, in each
instance, "metre"  should be -- meter --.
```

Signed and Sealed this

Twelfth Day of August 1980

[SEAL]

Attest:

SIDNEY A. DIAMOND

Attesting Officer

Commissioner of Patents and Trademarks